US012709515B1

(12) United States Patent
Warnick et al.

(10) Patent No.: US 12,709,515 B1
(45) Date of Patent: Aug. 18, 2026

(54) SMART ELEVATOR SYSTEM WITH DYNAMIC OCCUPANCY LIMIT

(71) Applicant: UIPCO, LLC, San Antonio, TX (US)

(72) Inventors: Mark Paxman Warnick, San Antonio, TX (US); Elena Marie Carrasco, Converse, TX (US); Celena Dortch, San Antonio, TX (US); Justin Dax Haslam, San Antonio, TX (US); David Jason Anderson James, San Antonio, TX (US); Quian Antony Jones, San Antonio, TX (US); Rosa Maria Smith, San Antonio, TX (US); Katrina Marie Zell, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1101 days.

(21) Appl. No.: 17/806,786

(22) Filed: Jun. 14, 2022

Related U.S. Application Data

(60) Provisional application No. 63/212,736, filed on Jun. 21, 2021.

(51) Int. Cl.

*B66B 1/34* (2006.01)
*B66B 5/00* (2006.01)
*B66B 5/14* (2006.01)

(52) U.S. Cl.

CPC .......... *B66B 1/3476* (2013.01); *B66B 5/0012* (2013.01); *B66B 5/145* (2013.01); *B66B 2201/215* (2013.01); *B66B 2201/40* (2013.01)

(58) Field of Classification Search

CPC ..... B66B 1/3476; B66B 5/0012; B66B 5/145; B66B 2201/215; B66B 2201/40
USPC .......................................................... 187/281
See application file for complete search history.

(56) References Cited

U.S. PATENT DOCUMENTS

2010/0236870 A1* 9/2010 Kostka .................... B66B 5/021 187/281
2018/0265333 A1* 9/2018 Schuster ................. B66B 13/14
2020/0024104 A1* 1/2020 Shin ....................... B25J 9/1697
2020/0031612 A1* 1/2020 Akkina ................. B66B 1/2458
2020/0055692 A1* 2/2020 Marpu .................. B66B 1/2408

* cited by examiner

*Primary Examiner* — Kawing Chan
(74) *Attorney, Agent, or Firm* — Plumsea Law Group, LLC

(57) ABSTRACT

A smart elevator system and method of use are disclosed. The smart elevator system includes a dynamic occupancy limit that is substantially less than a weight-based maximum occupancy for the elevator system. The smart elevator system can operate an elevator so that the number of passengers in the elevator never exceeds the dynamic occupancy limit. The dynamic occupancy limit can be set to limit the number of passengers in an elevator in accordance with social distancing criteria.

11 Claims, 10 Drawing Sheets

SMART ELEVATOR SYSTEM WITH DYNAMIC OCCUPANCY LIMIT

CROSS-REFERENCE TO RELATED APPLICATIONS

This application claims the benefit of Provisional Patent Application No. 63/212,736 filed Jun. 21, 2021, and titled "Smart Elevator System with Dynamic Occupancy Limit," which is incorporated by reference herein in its entirety.

TECHNICAL FIELD

The present disclosure generally relates to elevators, and in particular to smart elevators.

BACKGROUND

In response to pandemics, many localities or businesses may impose restrictions on the maximum number of occupants allowed in an elevator. This maximum number may be determined according to social distancing protocols. Current systems are limited to monitoring weight and signaling when the weight capacity of the elevator has been reached. However, because the number of people that can be accommodated under social distancing protocols is significantly lower than the number of people who can safely be accommodated below the maximum weight capacity of the elevator, limiting occupants according to the weight capacity is inadequate in facilitating social distancing, as the weight limit will only be reached once the elevator is completely full, with no substantial spacing between passengers.

Existing elevators are not currently equipped to discourage or otherwise prevent people from breaking social distancing protocols that might endanger the health of the occupants in the elevator as well as people nearby in the building. Existing elevators also are not able to accommodate social distancing protocols in a manner that maximizes operating efficiency.

There is a need in the art for a system and method that addresses the shortcomings discussed above.

SUMMARY

In one aspect, a smart elevator system includes an elevator, the elevator having a weight-based maximum occupancy. The system also includes an elevator control device, the elevator control device further including a processor and memory, where the memory stores a programmable dynamic occupancy limit. The dynamic occupancy limit is substantially less than the weight-based maximum occupancy. The elevator control device further includes a communications module configured to communicate with one or more mobile devices. The control device is configured to detect the number of passengers inside the elevator and operate the elevator to prevent the number of passengers inside the elevator from exceeding the dynamic occupancy limit for longer than a threshold period.

In another aspect, a method of controlling a smart elevator system with a dynamic occupancy limit stored in memory and a weight-based maximum occupancy, where the dynamic occupancy limit is substantially less than the weight-based maximum occupancy, includes the steps of retrieving the dynamic occupancy limit from memory; detecting a number of occupants in the elevator; and operating the smart elevator system in a drop-off only mode when the number of occupants in the elevator exceeds the dynamic occupancy limit.

In another aspect, a method of controlling a smart elevator system with a dynamic occupancy limit stored in memory and a weight-based maximum occupancy, where the dynamic occupancy limit is substantially less than the weight-based maximum occupancy, includes the steps of retrieving the dynamic occupancy limit from memory; detecting a number of occupants in the elevator; determining an available occupancy based on the number of occupants in the elevator and the dynamic occupancy limit; detecting the number of passengers waiting for the elevator at the current floor; and initiating a queueing process when the number of passengers at the current floor is greater than the available occupancy.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Embodiments provide a smart elevator system that can be operated to help facilities and passengers abide by social distancing protocols. Specifically, the smart elevator system can be programmed with a dynamic occupancy limit, which indicates a maximum number of passengers that can travel in the elevator while still meeting selected social distancing protocols. Because social distancing protocols may tend to reduce the maximum number of occupants far below the typical weight-based maximum occupancy for a given elevator, the dynamic occupancy limit may be substantially less than the weight-based maximum occupancy for the elevator.

The smart elevator system can detect passengers inside the elevator cab, as well as passengers that may be waiting for the elevator at one or more floors. In some embodiments, the smart elevator system uses inputs from various imaging devices, mobile devices carried or worn by passengers, and/or other sensors as inputs to determine the number of passengers inside of, and/or waiting for, the elevator.

The smart elevator system can automatically adjust its route (or schedule) to ensure that the number of occupants never exceeds the dynamic occupancy limit, or else exceeds this limit for only a brief period.

In some embodiments, the smart elevator system can operate in a drop-off only mode, when it is determined that the current number of occupants exceeds the dynamic occupancy limit. In other embodiments, the smart elevator system can utilize a queueing system to ensure the number of occupants does not exceed the dynamic occupancy limit. In still other embodiments, the smart elevator system can determine an optimized route that minimizes passenger waiting/travel time while ensuring the occupancy never exceeds the dynamic occupancy limit.

Moreover, because the dynamic occupancy limit is programmable, the smart elevator system can readily adapt to changes in social distancing guidelines/protocols.

Throughout the detail description and in the claims, the terms "occupants," "passengers," and "users" may be used interchangeably to refer to anyone inside an elevator or anyone intending to use an elevator (such as people waiting for an elevator at a given floor).

Figure 1:
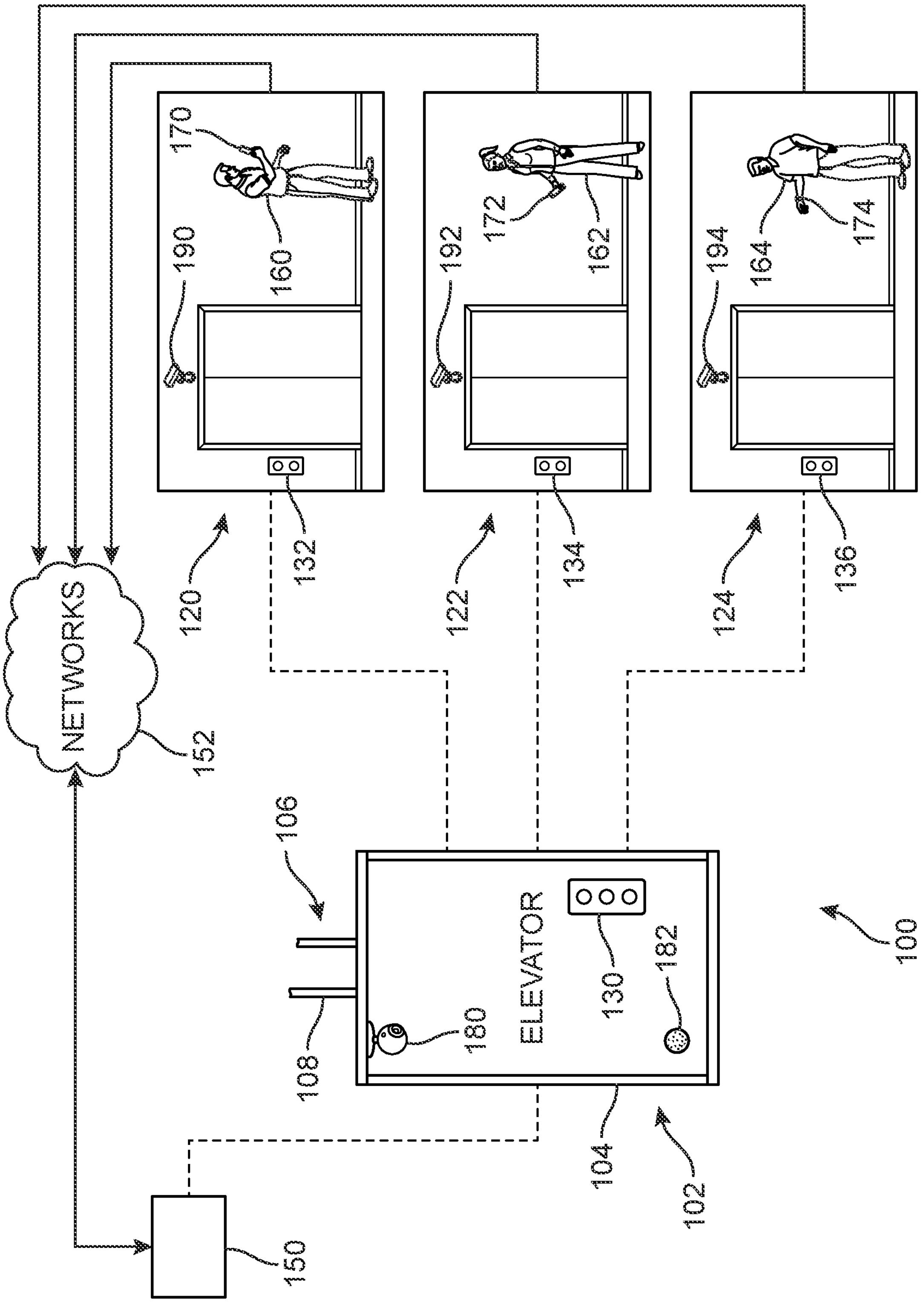
FIG. 1 is a schematic view of an elevator system, according to an embodiment.

FIG. 1 is a schematic view of a smart elevator system 100, also referred to simply as elevator system 100. As used herein, the term "elevator system" may refer to multiple components whose coordinated operation allows users in a building to travel between two or more floors of the building. Elevator system 100 may be further comprised of an elevator 102. The elevator comprises both a cab 104 (also known as a "cabin" or "car"), as well as a lifting system 106.

Lifting system 106 may comprise various components, according to the type of elevator used. In some embodiments, lifting system 106 could be a hydraulic-based system, which may include pistons and an electric motor that forces hydraulic fluid into the piston to raise the elevator. In other embodiments, lifting system 106 could use traction-based systems that include ropes or cables and a motor that drives the ropes or cables. Moreover, the elevator system can include additional provisions such as an elevator shaft within a building, guide rails for guiding the cab, as well as other provisions. For clarity, in the embodiment of FIG. 1, only some components of lifting system 106 are shown. Specifically, cables 108 that could be mounted to a drive wheel.

In the exemplary embodiment, elevator 100 may move between three floors, including a first floor 120, a second floor 122, and a third floor 124. Input can be given via a calling system that includes components inside of cab 104 and outside of cab 104, at each of the floors. For example, cab 104 includes an in-cab input panel 130 where passengers can enter their destination floor. Each floor may also include a separate panel for calling the elevator, including first floor input panel 132, second floor input panel 134, and third floor input panel 136. Each of these floor input panels can include either a single button, two buttons (indicating whether the passenger wants to go up or down), or three or more buttons.

Each input device can be connected to a control device 150 of elevator system 100. Control device 150 could be located on cab 104, or at another location in or near the shaft where the elevator travels. Control device 150 may receive input from input devices and use this information to determine which floor to go to next.

In the exemplary system, users can communicate with the elevator system using one or more mobile devices. Exemplary mobile devices include, but are not limited to: smart phones, tablets, smart watches, and/or other wearables. More specifically, information may be exchanged between control device 150 and one or more mobile devices over a network 152. Any suitable network, including any of the networks described below, could be used in the embodiments.

In the embodiment of FIG. 1, a first passenger 160 on first floor 120 is using mobile phone 170. Likewise, a second passenger 162 on second floor 122 is using mobile phone 172. Furthermore, a third passenger 164 on third floor 124 is using smart watch 174. As discussed in further detail below, this allows elevator system 100 to gather information from and/or about passengers, as well as provide information to the passengers in the form of alerts and/or messages.

Elevator 102 can also include additional components, such as an on-board camera 180 and a weight sensor 182. Likewise, in some embodiments there may be an imaging device, such as a camera, stationed at each floor near the corresponding set of elevator doors. In the embodiment of FIG. 1, elevator system 100 further includes a first camera 190 on first floor 120, a second camera 192 on second floor 122, and a third camera 194 on third floor 124. Each of these cameras may be located and positioned so that the camera can capture images of persons who may be waiting for the elevator.

Each of the components described above for elevator system 100 can be connected via wired or wireless means to other devices or components. For example, in one embodiment each of the input panels at the different floors could be connected to components within elevator 102 and/or control device 150 using wired connections. In other embodiments, each of the input panels at the different floors could be connected to components within elevator 102 and/or control device 150 using wireless connections. Likewise, the cameras located at different floors could communicate with any other components of the system using wired or wireless connections.

Figure 2:
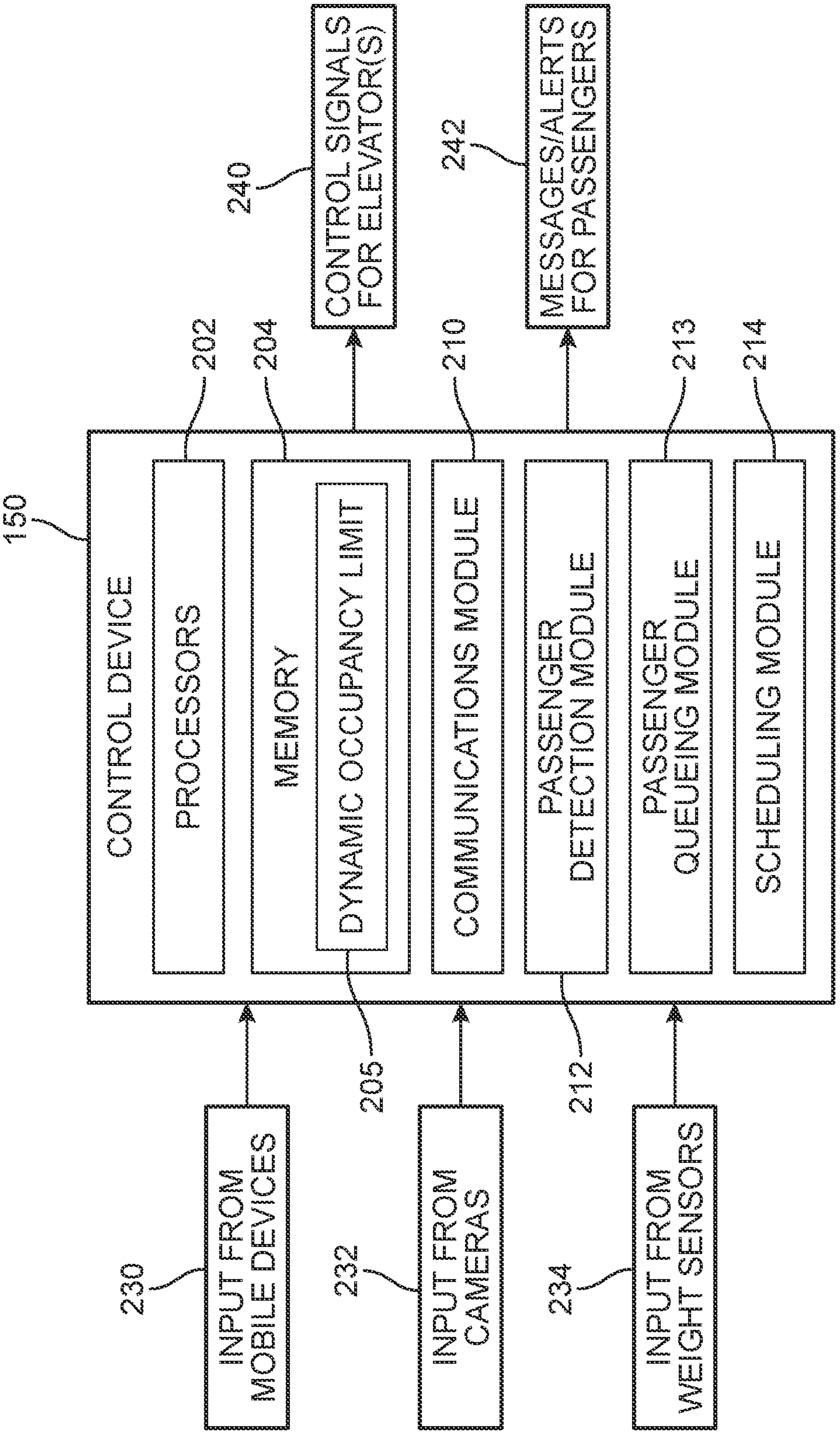
FIG. 2 is a schematic view of a control device, according to an embodiment.

FIG. 2 is a schematic view of control device 150, according to an embodiment. Control device 150 may comprise components, such as processors, memory, and software modules, that facilitate operation of elevator system 100. In this embodiment, control device 150 may include one or more processors 202 and memory 204. Memory 204 may comprise a non-transitory computer readable medium. Instructions stored within memory 204 may be executed by processors 202. Memory 204 stores a variety of data and applications.

Control device 150 may further include one or more modules for performing different functions related to controlling elevator system 100. These can include, but are not limited to, a communications module 210, a passenger detection module 212, a passenger queueing module 213, and a scheduling module 214.

Communications module 210 may include hardware components and/or software for facilitating communication with other components or devices. For example, communications module 210 could include hardware and/or software for managing communication over networks such as Wi-Fi, Bluetooth, and cellular networks (such as Global System for Mobile Communication based networks or Code Division Multiple Access based networks). In some cases, communications module 210 incudes hardware and/or software for facilitating near field communication (NFC) with other devices or components. Communications module 210 may also include hardware and/or software components for communication via any other networks, including local area networks, wide area networks, and/or personal area networks.

Passenger detection module 212 may include hardware and/or software components detecting passengers within an elevator, as well as persons waiting to ride on the elevator at a given floor. Thus, passenger detection module 212 may include software for receiving and analyzing image data, or other kinds of sensory data that can be used to determine the presence and/or number of passengers in the elevator cab and/or waiting at a given floor. In one embodiment, passenger detection module 212 includes a machine vision system that can detect people from still or video images of an area, which may be captured by a camera on the elevator (for example, camera 180) or cameras on each floor that are adjacent to the elevator (for example, camera 160, camera 162, and camera 164). The machine vision system can include any known algorithms for identifying people within images. These could include, but are not limited to: object detection algorithms using deep neural networks, object recognition using Support Vector Machines (SVM), or other suitable algorithms.

Passenger queueing module 213 may be used to determine a queueing order and/or queueing groups for passengers. Passenger queueing module 213 could include submodules for detecting elevator request order, assigning queueing positions or groups, and sending alerts to other devices indicating the queueing order and/or status.

Scheduling module 214 may be used to determine routes for the elevator based on various inputs, such as the number of passengers in the elevator, the number of people waiting at various floors, and the number of people allowed in the elevator at any given time. In some cases, scheduling module 214 includes one or more optimization algorithms for determining optimal routes for the elevator based on selected optimization parameters.

In one embodiment, memory 204 may store a dynamic occupancy limit 205, which is a programmable data value that indicates the maximum number of passengers that can ride in the elevator based on dynamic features that are not related to the structural and/or mechanical properties of the elevator. Specifically, whereas the weight-based maximum occupancy may depend on the structural properties of the elevator and lifting systems, the dynamic occupancy limit may depend on other factors that could be variable and are not determined solely by the elevator's structural properties.

The dynamic occupancy limit can be programmed using any suitable configuration. In some embodiments, authorized users with access to the elevator system can connect to control device 150 either directly, or via a network (such as using network 152). Once in communication with control device 150, an authorized user can manually set the dynamic occupancy limit. Specifically, the value of the dynamic occupancy limit can be set so that passengers in the elevator can be properly distanced from one another, even when the capacity is at the dynamic occupancy limit, according to some suitable social distancing protocols.

In one embodiment, the dynamic occupancy limit may be determined by social distancing criteria such as laws, rules, guidelines, protocols, or recommendations. These social distancing criteria may indicate how far away persons must be spaced in a given area, and/or how many people can safely be together in an enclosed space of a given size (such as an elevator). The social distancing criteria may themselves vary according to the current status of any infectious diseases, as well as an evolving understanding of how to slow down the spread of such diseases. Therefore, as social distancing criteria are changed, the dynamic occupancy limit can change accordingly. As an example, if a new infectious disease is detected in a given geographic region, initial guidelines may be cautious and suggest a minimum distance of 15 feet between adjacent persons. In such a case, it may be necessary to limit elevator rides to a single occupant at a time. However, over time a better understanding of this particular infectious disease could lead to new recommendations of only a few feet. Depending on the size of the elevator, then, the dynamic occupancy limit could be adjusted to allow for multiple occupants at a time.

Memory 204 may or may not also store data values used by one or more of communications module 210, passenger detection module 212, and scheduling module 214. Furthermore, in some cases, the software instructions associated with each module could be stored in memory 204. In other embodiments, however, one or more modules could be configured with their own separate memory.

As shown in FIG. 2, control device 150 may be configured to receive various inputs, which can then be processed by various modules to produce outputs. In this example, control device 150 may receive at least a first input 230 from mobile devices (such as the smartphones of the passengers), a second input 232 from cameras (such as camera 180, camera 160, camera 162, and/or camera 164), and a third input 234 from weight sensors (such as sensor 182). Some or all of these inputs can be processed by one or more of communications module 210, passenger detection module 212, passenger queueing module 213, and scheduling module 214.

One or more of the modules can output at least a first output 240. First output 240 may comprise one or more control signals for the elevator. Specifically, the control signals are used to control the appropriate lifting systems that raise and lower the elevator. Or alternatively, control system 150 could output a given floor and/or route comprised of a sequence of two or more floors, which is passed to a controller downstream that operates the lifting mechanisms accordingly.

In some embodiments, an optional second output 242 comprises messages and/or alerts for passengers, which are described in further detail below. In some cases, control device 150 sends SMS messages, or messages to an app running on the passengers' phones using a suitable application program interface (API).

Figure 3:
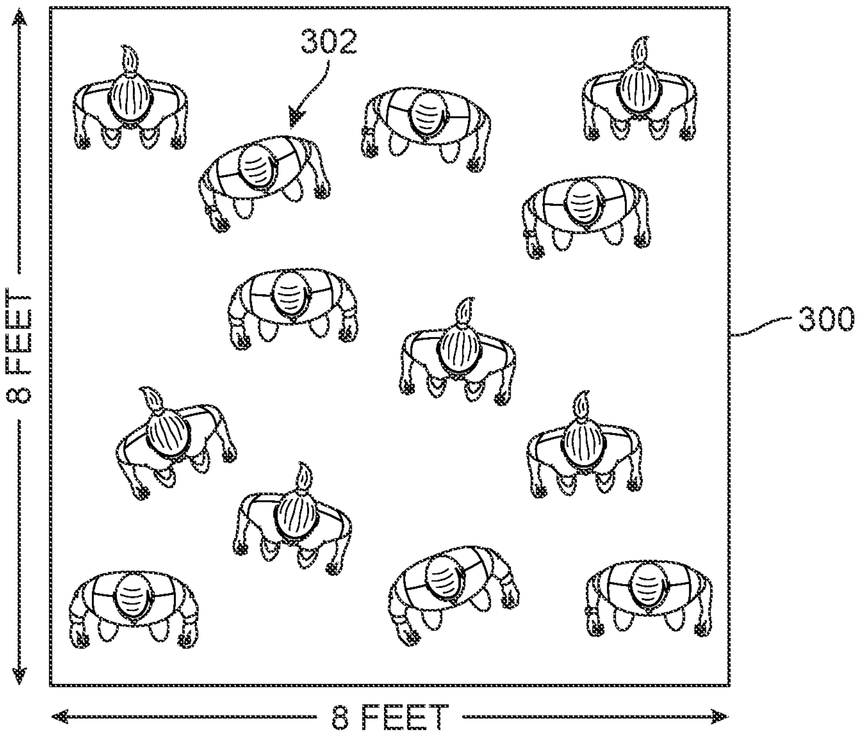
FIG. 3 is a schematic view of a configuration of occupants in an elevator, according to an embodiment.

FIG. 3 is a schematic embodiment showing a group of eleven passengers 302 that may fit comfortably into an elevator 300 that has an 8'×8' footprint, according to an embodiment. For clarity, only a portion of elevator 300 is shown. In some cases, additional passengers could be added until the weight-based maximum occupancy of the elevator is reached and/or until there is no more room in the cab.

Figure 4:
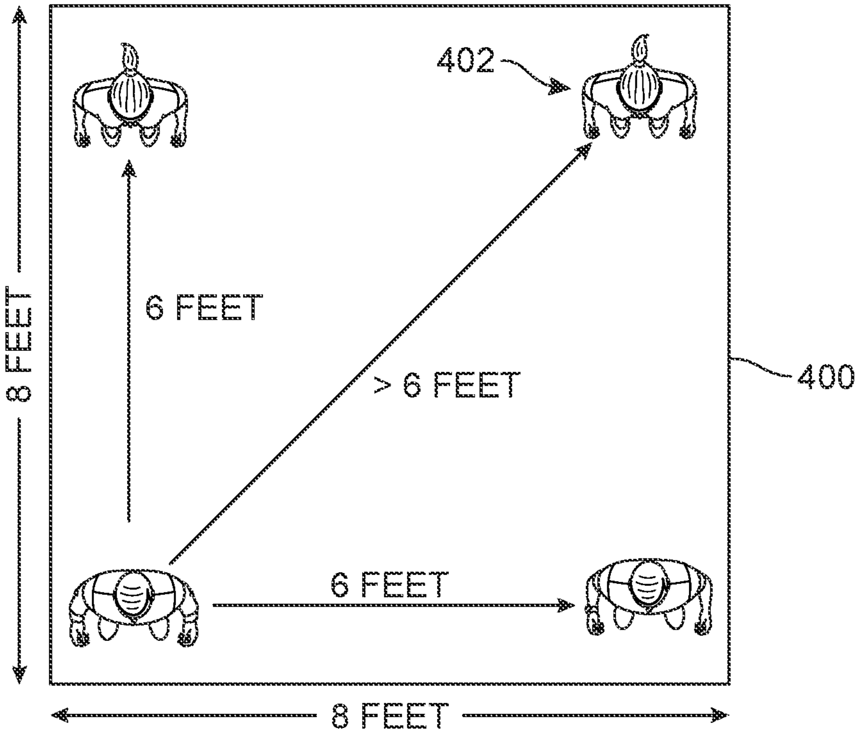
FIG. 4 is a schematic view of another configuration of occupants in elevator, according to another embodiment.

FIG. 4 is a schematic embodiment showing a group of four passengers 402 in an elevator 400, which is operated according to the principles of the present embodiments. Elevator 400 may also have an 8' by 8' footprint. But in contrast to elevator 300, which may operate using only a weight-based maximum occupancy to determine the maximum number of passengers that can ride at a time, elevator 400 uses a dynamic occupancy limit that is based on selected social distancing protocols. In this case, the dynamic occupancy limit is four, indicating that no more than four passengers can be fit into the elevator while ensuring that all passengers be kept at least six feet apart from one another. As seen by comparing FIGS. 3 and 4, the dynamic occupancy limit of four passengers for elevator 400 is significantly fewer than the number that can otherwise be fit into an elevator of the same size (elevator 300) without exceeding the weight-based maximum occupancy of the elevator.

It may be appreciated that FIG. 4 is only intended as one example of how an elevator system could be operated to accommodate social distancing protocols. In other cases, with different social distancing protocols, and/or different sizes of elevator, the maximum number (and arrangement) of passengers allowed in the elevator cab that still meets the selected social distancing protocols could be different. However, in each case, it may be apparent that the particular value of the dynamic occupancy limit may be substantially less than the weight-based maximum occupancy of the elevator. As used herein, a dynamic occupancy limit may be substantially less than the weight-based maximum occupancy if the dynamic occupancy limit is less than 80 percent of the weight-based maximum occupancy. In some embodiments, the dynamic occupancy limit could have a value approximately in a range between 10 percent and 90 percent of the weight-based maximum occupancy. In other embodiments, the dynamic occupancy limit could have a value approximately in a range between 20 percent and 60 percent of the weight-based maximum occupancy.

Figure 5:
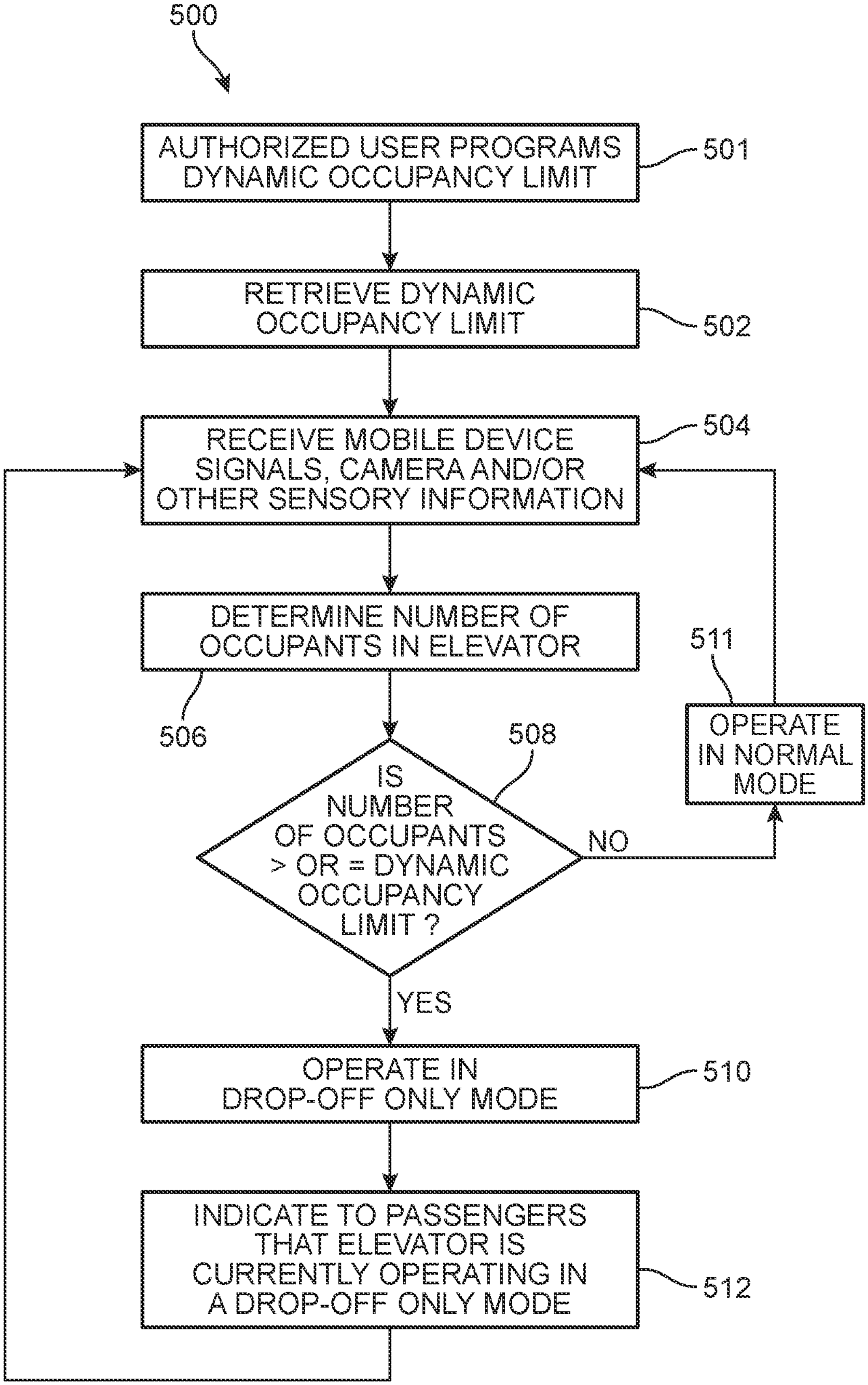
FIG. 5 is a schematic view of a process for operating an elevator, according to an embodiment.

FIG. 5 is a schematic view of a process 500 for operating an elevator so that the number of people on the elevator never exceeds the dynamic occupancy limit, or else only exceeds the limit for a substantially short interval of time (for example, the length of time required for the elevator to make one pass between the bottom most and top most floors). In some embodiments, one or more of the following steps could be performed by components of an elevator system. In one embodiment, one or more steps may be performed by a control device, such as control device 150.

Starting at step 501, the dynamic occupancy limit may be programmed by an authorized user. During this step, control device 150 may receive the authorized user's setting and store the setting in memory.

Starting at step 502, control device 150 may retrieve the dynamic occupancy limit from memory (for example, memory 204 in FIG. 2). Next, in step 504, control device 150 may receive signals from mobile devices, camera, and/or other sensory information.

In step 506, control device 150 may determine the number of occupants in the elevator. In different embodiments, the method of determining the number of occupants may be selected according to the type of input gathered during step 504. For example, in embodiments where mobile device signals are received, it may be possible for control device 150 to determine if the mobile devices transmitting the signals are located within the elevator, based on relationships between distance and expected signal strength. Alternatively, in some cases, mobile devices could be configured to identify when they are on an elevator, and transmit that information as data to a control device. For example, an application running on a passenger's phone may detect that the user has entered an elevator based on various kinds of information, including high precision location information, images captured by the devices phone, proximity sensor information, RFID sensors, as well as any other suitable kind of information for deducing when a user has entered an elevator. In one embodiment, a local wireless network running within the elevator with a very small spatial extent (on the order of a couple meters) may detect the presence of mobile devices on the network, and thereby infer the presence of occupants.

In other embodiments where image information is received, control device 150 could use object and/or facial recognition to detect the presence of occupants in the elevator. In still other embodiments, other suitable kinds of sensory information, including audible information and/or weight information could be used to infer a particular number of occupants in the elevator.

Once the number of occupants in the elevator has been detected, the system may check to see if the current number of occupants equals or exceeds the dynamic occupancy limit in step 508. If so, the system proceeds to step 510 to operate in a "Drop-Off Only" mode. In the Drop-Off Only mode, control device 150 automatically operates the elevator in a manner that prevents additional passengers from being picked up before the number of occupants can be decreased below the dynamic occupancy limit. In this mode, the elevator may not stop at floors where passengers are waiting to be picked up. Instead, control device 150 may move the elevator to a floor that has been selected as a destination for one or more occupants in the elevator to allow some passengers to get off.

In some embodiments, the elevator system can signal to passengers that it is operating in a Drop-Off Only mode in step 512. Such signaling could be done via visual alerts, for example using signs, lights, or electronic displays, or using audible alerts. Visual or audible alerts could include announcements such as "This elevator is currently operating in Drop-Off Only mode, at this time please do not enter the elevator." In some embodiments, a message could be sent to mobile devices carried or worn by passengers indicating that the elevator is operating in Drop-Off Only mode.

Next, the system may return to step 504, receiving updated information from one or more sources. This is used to determine, in step 506, the current number of occupants in the elevator. In step 508, the system determines if the number of occupants has decreased below the dynamic occupancy limit. If so, the system will return to operating in a "Normal Mode", in step 511. In the Normal Mode, the elevator may not skip floors and may let occupants on and off until a point where the current number of occupants once against exceeds the dynamic occupancy limit. This process may continue repeating, with the elevator continually switching between a Normal Mode and Drop-Off Only mode to ensure the number of occupants remains below the dynamic occupancy limit, or else does not exceed the dynamic occupancy limit for very long.

In some embodiments, it may be appreciated that the system could determine the number of occupants in the elevator as each new passenger steps inside. This ensures the system can identify the exact point at which the number of passengers exceeds, or is about to exceed, the dynamic occupancy limit. This allows the system to switch immediately to a Drop-Off Only mode before additional passengers can board the elevator. In some cases, the elevator may alert waiting passengers that it cannot accept any more occupants. In some cases, the number of passengers in the elevator may exceed the dynamic occupancy limit for a very short period of time, before the system takes some action to remedy the situation and reduce the number of passengers in the cab. In other words, the elevator may be operated so that the occupancy never exceeds the dynamic occupancy limit for longer than a threshold period. In some cases, the threshold period has a value approximately in a range between 1 second and 100 seconds. In some cases, the threshold period may be substantially less than the travel time of an elevator between adjacent floors.

This could be accomplished by announcing that one passenger must exit, or else by sending a message to the device of the passenger that must exit.

Figure 6:
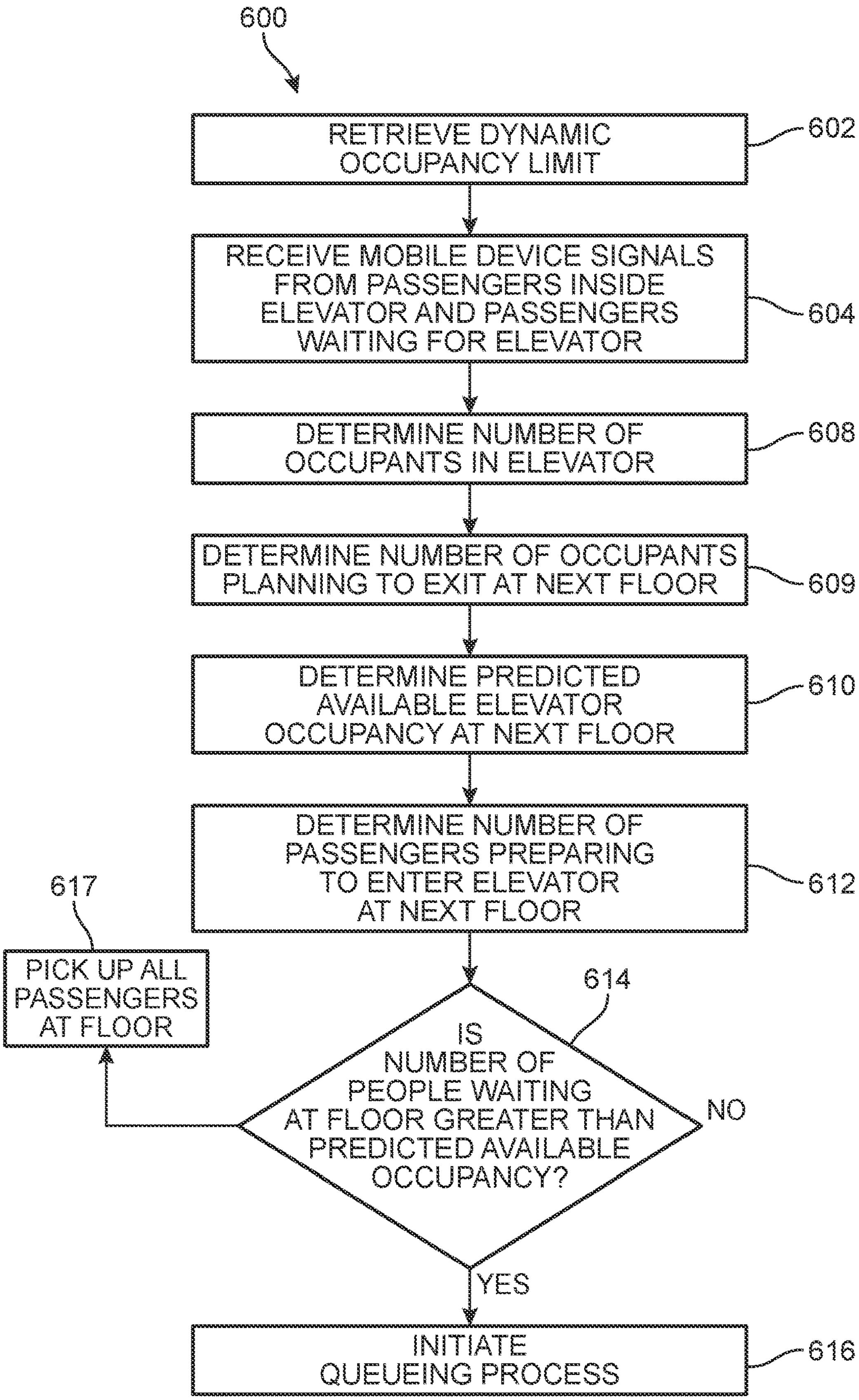
FIG. 6 is a schematic view of a process for operating an elevator, according to an embodiment.

FIG. 6 is a schematic view of another process 600 for operating an elevator so that the number of people on the elevator never exceeds the dynamic occupancy limit. In some embodiments, one or more of the following steps could be performed by components of an elevator system. In one embodiment, one or more steps may be performed by a control device, such as control device 150.

Starting at step 602, control device 150 may retrieve a dynamic occupancy limit from memory (for example, memory 204 in FIG. 2). Next, in step 604, control device 150 may receive signals from mobile devices, camera, and/or other sensory information. In particular, in this embodiment, control device 150 may receive information from and/or about both passengers inside the elevator and passengers who may be waiting outside the elevator. This can include mobile device information, image information, and/or other kinds of sensed information.

In step 608, control device 150 may determine the number of occupants in the elevator using any of the methods already described above corresponding to step 506 of the process in FIG. 5.

In step 609, control device 150 may determine the number of occupants planning to exit the elevator at the next floor (that is the current destination floor for the elevator). In different embodiments, the method used for determining the number of occupants planning to get off at the next floor may be selected according to the type of information gathered in step 604. In some cases, passengers traveling on the elevator could send information via a mobile application, including the current floor where they are waiting and their destination floor. Using this destination information, control device 150 could determine exactly how many occupants will be leaving the elevator at the next floor. Alternatively, when this information is unavailable, control device 150 could use sensory information, as well as floors that have been selected on the input panel inside the elevator, to infer which occupants may be leaving at the next floor. For example, if two occupants have been detected by the control device and only a single floor is selected on the input panel, the system can infer that both occupants plan to get off at the selected floor. Likewise, if two floors have been selected, and two occupants are present, the system can infer that one occupant will be getting off at the next floor.

In step 610, control device 150 may determine the predicted available elevator occupancy at the next floor based on the dynamic occupancy limit. As used herein, the term "available elevator occupancy" refers to the maximum number of passengers who can get on to the elevator at the next floor so that the total number of occupants in the elevator does not exceed the dynamic occupancy limit.

Knowing the dynamic occupancy limit (step 602), the current number of occupants (step 608), and the number of occupants planning to exit at the next floor (step 609), control device 150 may calculate the available elevator occupancy. Here, the "next floor" refers to the current destination for the elevator.

Specifically, in some cases, the system could use the formula:

(Available elevator occupancy)=(dynamic occupancy limit)−(current number of occupants)+(occupants exiting at next floor)

As an example, if the dynamic occupancy limit of an elevator is set at 5, and there are currently 3 occupants with 2 planning to get off at the next floor, the available elevator occupancy is (5−3+2)=4. That means, once two of the current occupants have left the elevator, there will be room for four additional passengers to come on to the elevator.

Next, in step 612, control device 150 may determine the number of passengers preparing to enter the elevator at the next floor. In some cases, this information could be received from a mobile elevator application, where passengers can call for an elevator using their mobile devices and indicate which floor they are waiting on. In other cases, the system could use image information from a camera positioned to capture images of waiting passengers, in order to count the number of passengers who are waiting to get on to the elevator.

In step 614, control device 150 determines if the number of people waiting for the elevator at the next floor is greater than the predicted available elevator occupancy. If not, no further action is required, and the elevator can pick up all the passengers at the next floor (step 617). However, if the number of passengers waiting at the next floor exceeds the predicted available elevator occupancy, control device 150 proceeds to step 616.

In step 616, control device 150 initiates a queueing process. The queueing process assigns a position (or group) in a queue to each of the waiting passengers. This queue could be managed, for example, through a mobile application on each passengers' mobile device. Using a queueing system ensures that people who have been waiting for the elevator longer are generally able to get onto the elevator sooner than those who have been waiting less time. The queueing system also allows for an orderly movement of passengers on and off the elevator. Alternatively, rather than assigning a queueing position, control device 150 could simply send a message to the waiting passengers that only a predetermined number of them can enter the elevator.

Figure 7:
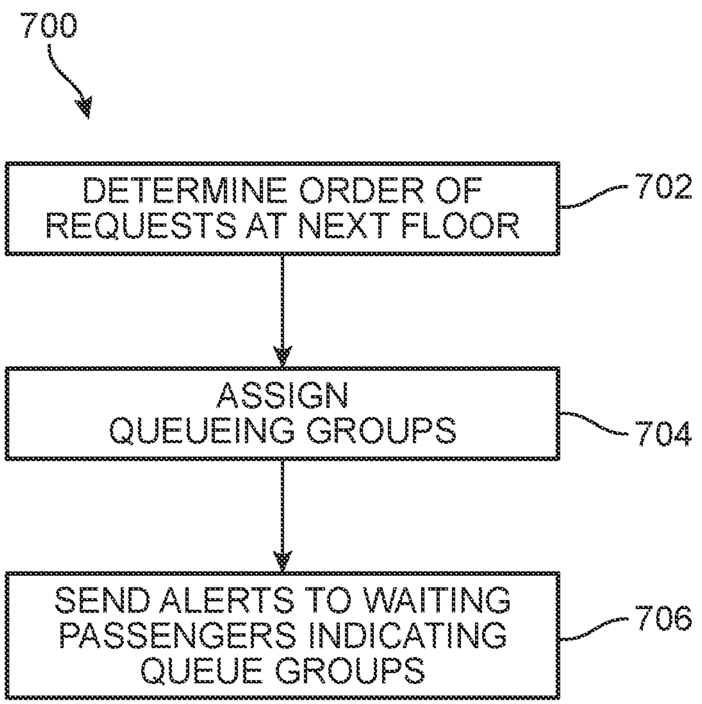
FIG. 7 is a schematic view of a process for managing queueing on an elevator, according to an embodiment.

FIG. 7 is a schematic view of a process 700 that could be used for queueing passengers. In some embodiments, one or more of the following steps could be performed by components of an elevator system. In one embodiment, one or more steps may be performed by a module of a control device, such as passenger queueing module 213 (see FIG. 2) of control device 150.

Starting in step 702, queueing module 213 may determine the order of requests made at the next floor. Here, the order of requests refers to the order in which the control device received requests from passengers to pick them up at a particular floor. In embodiments where calls to the elevator are made using a mobile device, the system can easily track the time that each request was received from each passenger's mobile device.

Next, in step 704, queueing module 213 may assign each waiting passenger to a queueing group. The size of the queueing groups may be selected according to the predicted available elevator occupancy. For example, if four passengers are waiting and the predicted available elevator occupancy is only two, the system may assign two passengers to a first queueing group and the remaining two passengers to a second queueing group. More specifically, the first queueing group may comprise the two passengers that made the earliest requests for the elevator on their mobile devices.

Next, in step 706, queueing module 213 may send alerts to waiting passengers to inform them of their queueing groups. When the elevator arrives, the passengers' mobile devices may indicate when groups are allowed to board the elevator. The remaining groups must wait until they are called, possibly when the elevator makes its next trip back to that same floor.

The exemplary system provides a fair and orderly system for loading an elevator when there is limited capacity on the elevator due to social distancing protocols.

Figure 8:
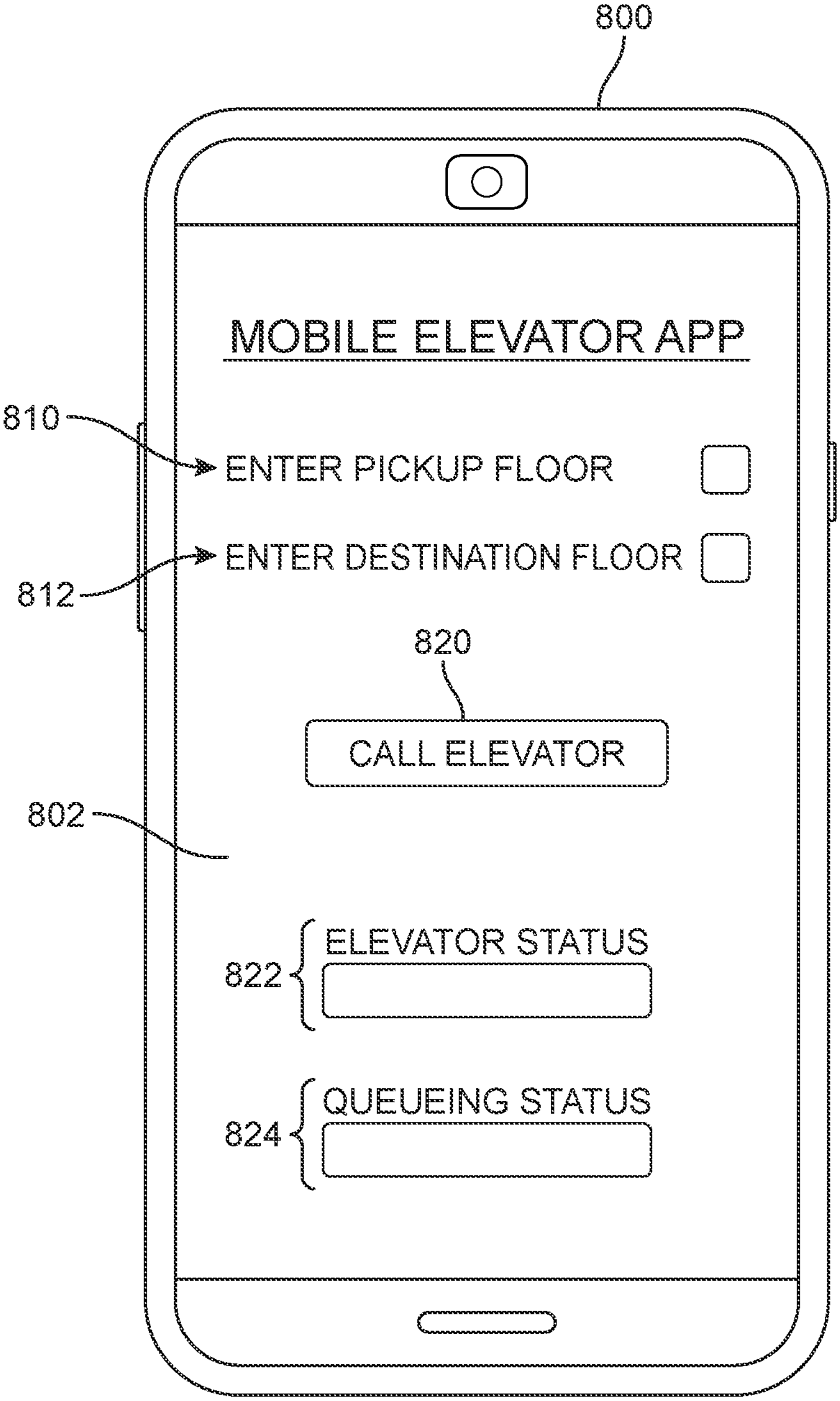
FIG. 8 is a schematic view of an embodiment of a mobile device running an elevator application.

FIG. 8 is a schematic view of a mobile device 800 configured to run a mobile elevator application 802, according to an embodiment. It may be appreciated that while mobile device 800 is shown as a mobile or smart phone in this embodiment, in other embodiments mobile device 800 could be any kind of mobile device that comprises a processor and memory, and which is capable of running a mobile elevator application. Other suitable mobile devices include, but are not limited to: tablet computing devices, smart watches, and other wearables.

Application 802 may provide a way for users to call an elevator with their mobile device. In particular, application 802 provides an interface where users can enter the floor where they need to be picked up (input 810) and their destination floor (input 812). Once these inputs are set, the user can use the Call Elevator button 820 within the app to send the request. In some embodiments, app 802 can also include an elevator status indicator 822. A variety of different statuses could be displayed, depending on the operating state of the elevator. These can include, but are not limited to: "Available Occupancy," "Currently Full," "Now Queueing," "Drop-Off Only mode," and so on.

Where an elevator system uses queueing, as in the process shown in FIG. 7 and described above, app 802 can further include a queueing status indicator 824, which may display various messages related to queueing when there are more passengers waiting for the elevator than can be accommodated with the dynamic occupancy limit. In some cases, queueing status indicator 824 could indicate the queueing group for the user (e.g., "Group A", "Group B", etc.). In such cases, the user may be informed via the app, or via sounds or visual messages from the elevator itself, when that queueing group is being called. Alternatively, rather than providing users with a queueing group, the system may simply track the queueing groups internally and send instructional messages accordingly. For example, any users belonging to a queue that is currently being asked to board the elevator may receive a message on their mobile device reading "Please Enter the Elevator Now." Whereas users in other queueing groups may receive a message on their mobile device reading "Please Wait for Next Elevator."

Figure 9:
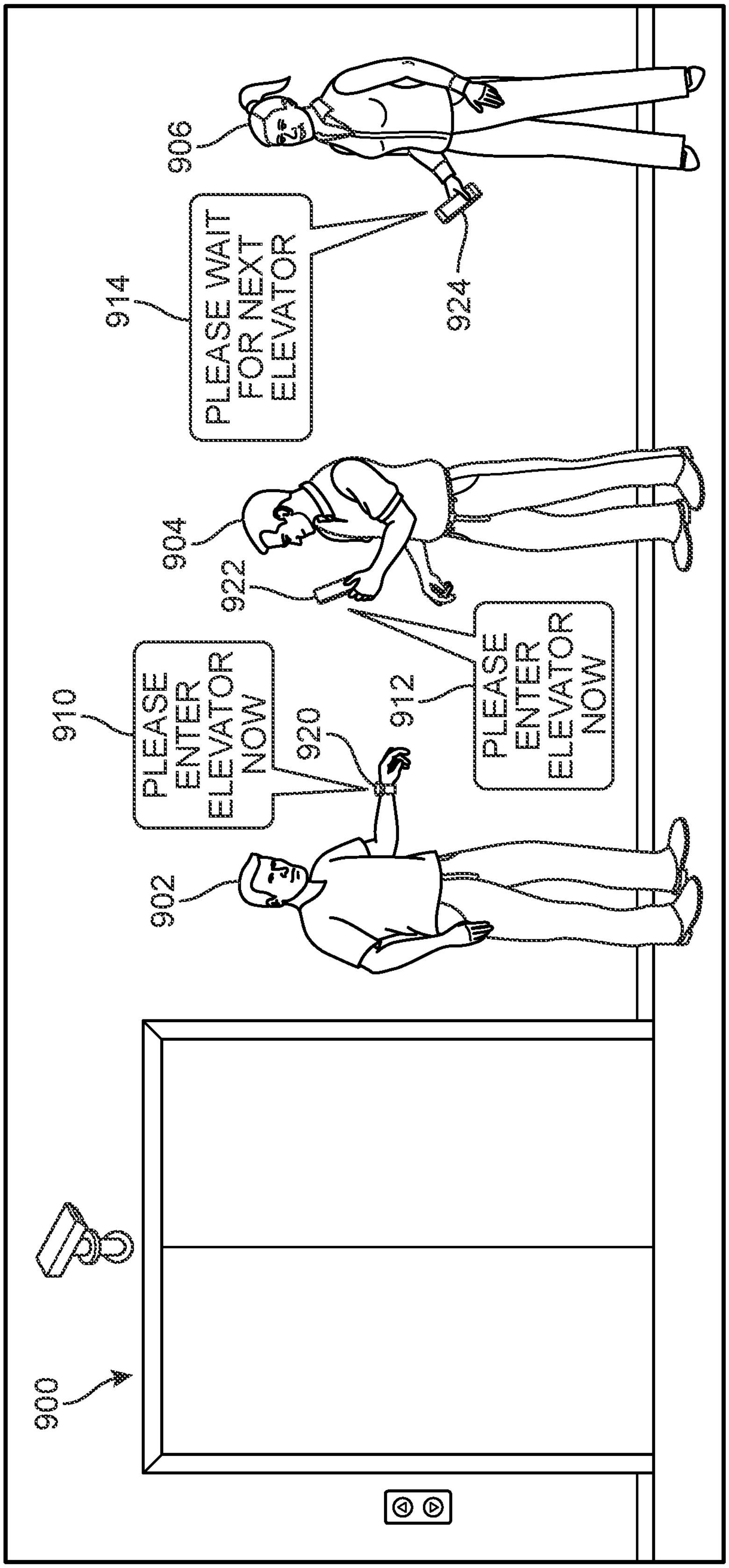
FIG. 9 is a schematic view of passengers receiving messages to queue for an elevator, according to an embodiment.

FIG. 9 is a schematic view of a situation where three passengers are waiting to board an elevator of elevator system 900, which uses a queueing system to ensure the number of occupants in the elevator does not exceed the dynamic occupancy limit. In this case, the system has already assigned each of first passenger 902, second passenger 904, and third passenger 906, to two or more queueing groups. Specifically, first passenger 902 and second passenger 904 have been assigned to a queueing group that will be called next to board the elevator, while third passenger 906 has been assigned to a queueing group that will have to wait for the next elevator. As the elevator arrives, or prior to its arrival, the elevator system sends messages to each passenger. As seen in FIG. 9, first passenger 902 receives a first message 910 on his smart watch 920 reading "Please enter elevator now." Second passenger 904 receives a substantially identical message 912 on his phone 922. However, third passenger 906 receives a message on her phone 914 reading "Please wait for the next elevator," since once first passenger 902 and second passenger 904 have boarded elevator 900 there will not be room for third passenger 906, given the current dynamic occupancy limit.

It may be appreciated that in this example, the first passenger 902 and second passenger 904 have both arrived at elevator 900 before third passenger 906 arrives. It may therefore be considered fair to third passenger 906 that she must wait while the other two are allowed to board immediately.

Figure 10:
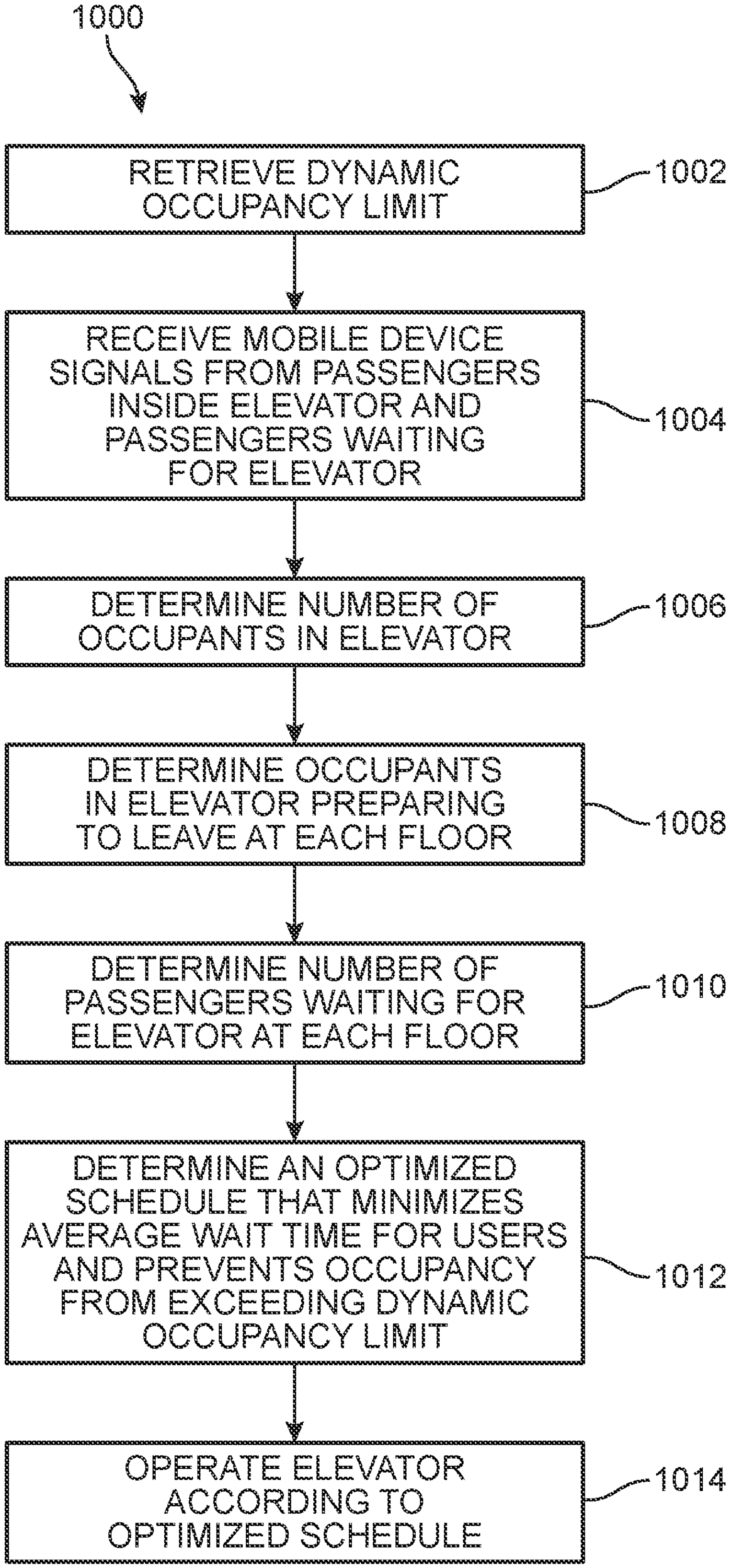
FIG. 10 is a schematic view of a process for operating an elevator, according to an embodiment.

FIG. 10 is a schematic view of a method 1000 of operating an elevator according to an optimized scheduled in order to follow social distancing protocols, according to an embodiment. In some embodiments, one or more of the following steps could be performed by components of an elevator system. In one embodiment, one or more steps may be performed by a control device, such as control device 150.

Starting in step 1002, control device 150 may retrieve the current dynamic occupancy limit from memory. Next, in step 1004, control device 150 may receive mobile device signals from passengers inside the elevator and from passengers waiting for the elector. In step 1006, control device 150 may determine the number of occupants in the elevator. In step 1008, control device 150 may determine the number of occupants in the elevator preparing to leave at each floor. In step 1010, control device 150 may determine the number of passengers waiting for the elevator at each floor.

With the information gathered from the previous steps, control device 150 may determine an optimized schedule that minimizes the average wait time for users and prevents the elevator occupancy from exceeding the dynamic occupancy limit in step 1012. Details of this optimization process are described below.

In step 1014, control device 150 may operate the elevator according to the optimized schedule determined in step 1012. It may be appreciated that throughout operation of the elevator, this method may be repeated, so that the optimized schedule is updated in real-time or near real-time according to changes in current elevator occupancy, number of passengers waiting at each floor, and the number of current occupants planning to exit at each floor.

Figure 11:
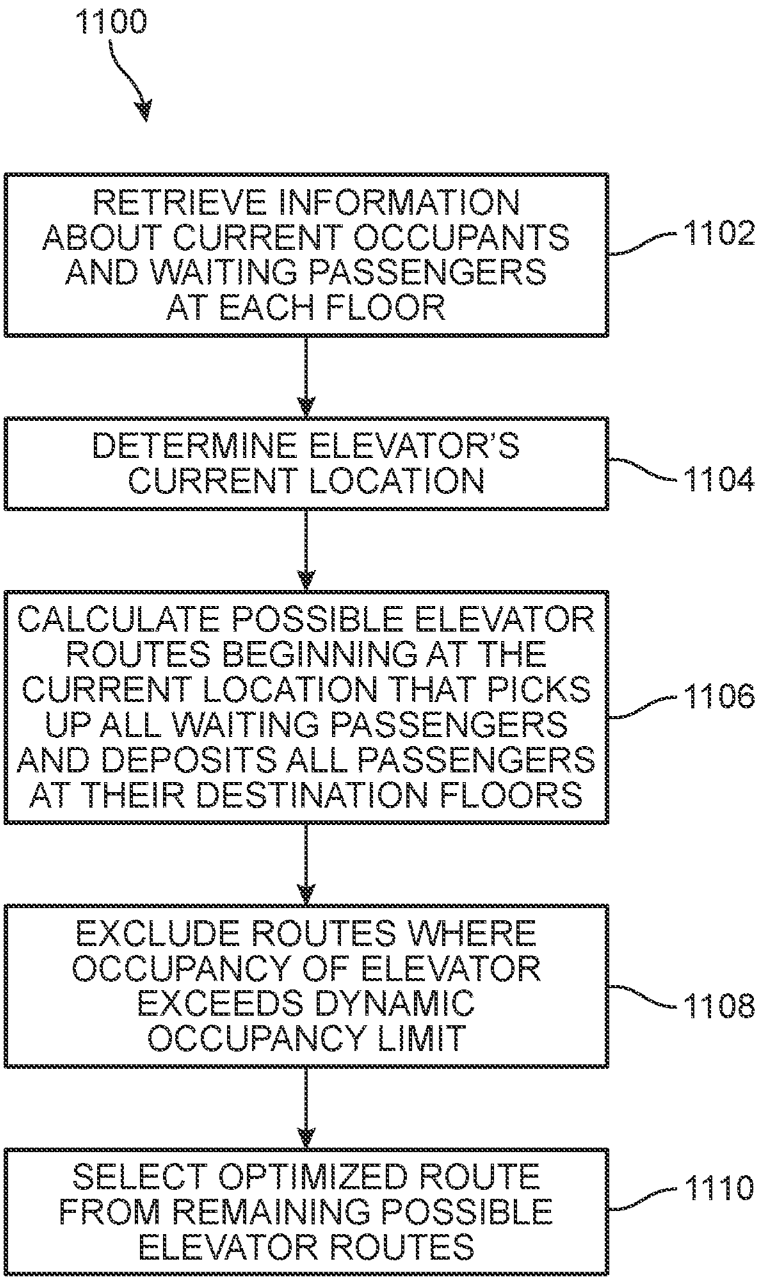
FIG. 11 is a schematic view of a process for selecting an optimized elevator route, according to an embodiment.

FIG. 11 is a schematic view of a method 1100 of determining an optimized schedule or route for an elevator, according to an embodiment. In some embodiments, one or more of the following steps could be performed by components of an elevator system. In one embodiment, one or more steps may be performed by a scheduling module of a control device (for example, scheduling module 214 of control device 150).

Starting in step 1102, scheduling module 214 may retrieve information about current occupants in the elevator and also information about all the passengers waiting at different floors. This information could include the destination floor for each passenger, as well as the pickup floor for waiting passengers.

Next, in step 1104, scheduling module 214 may determine the elevator's current location. The current location could be a particular floor, or a location between two adjacent floors.

In step 1106, scheduling module 214 may calculate possible elevator routes beginning at the current location that picks up all waiting passengers and deposits all passengers at their destination floors. A route (or schedule) may comprise a list of floors along with the number of passengers expected to enter and exit at each floor. Moreover, the list is ordered, so that the elevator travels to each floor in the sequence given by the route/schedule.

In step 1108, scheduling module 214 may exclude routes where the occupancy of the elevator exceeds the dynamic occupancy limit at any point along the route. It may be appreciated that in some cases, the dynamic occupancy limit can be provided as a constraint on generating a possible route in step 1106, rather than first generating a list of possible routes and, subsequently, excluding the subset where the dynamic occupancy limit is exceeded.

In step 1110, scheduling module 214 may select an optimized route from the remaining possible elevator routes. That is, an optimized route is selected from the subset of routes where the dynamic occupancy limit is not exceeded.

The optimized route may be selected according to a suitable optimization criteria. In one embodiment, an optimized route may be the route that minimizes the average time spent waiting for, and riding, the elevator. Other optimization metrics could include minimizing the total travel distance of the elevator along the entire route. It may be appreciated that any suitable optimization algorithms could be applied to determine optimized routes.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A smart elevator system with a dynamic occupancy limit stored in memory and a weight-based maximum occupancy, wherein the dynamic occupancy limit is substantially less than the weight-based maximum occupancy, the system comprising:

an elevator control device configured to:

retrieve the dynamic occupancy limit from memory;

detect a number of occupants in the elevator;

determine an available occupancy based on the number of occupants in the elevator and the dynamic occupancy limit;

detect a number of passengers waiting for the elevator at the current floor; and initiate a queueing process when the number of passengers at the current floor is greater than the available occupancy;

wherein the elevator control device is configured to initiate the queueing process by sending messages to passengers waiting at the current floor;

wherein the elevator control device is configured to send messages to passengers waiting at the current floor by sending a first message to a mobile device of a first passenger waiting at the current floor and sending a second message to a mobile device of a second passenger waiting at the current floor, wherein the first message is substantially different from the second message.

2. The smart elevator system according to claim 1, wherein the elevator control device receives image information, and wherein the elevator control device is configured to use the image information to detect the number of occupants inside the elevator.

3. The smart elevator system according to claim 1, wherein the elevator control device receives information from one or more mobile devices worn or carried by occupants in the elevator, and wherein the elevator control device is configured to use the information from one or more mobile devices to detect the number of occupants inside the elevator.

4. The smart elevator system according to claim 1, wherein the system is operable in a drop-off only mode, wherein new occupants cannot enter the elevator while the system is in the drop-off only mode;

wherein the elevator control device is further configured to operate the system in the drop-off only mode when the number of occupants inside the elevator is greater than the dynamic occupancy limit.

5. The smart elevator system according to claim 4, wherein the elevator control device is further configured to:

monitor the number of occupants inside the elevator while the system is operated in the drop-off only mode; and switch operation of the system from the drop-off only mode to a normal mode when the number of occupants in the elevator drops below the dynamic occupancy limit, wherein the normal mode is substantially different from the drop-off only mode.

6. The smart elevator system according to claim 4, wherein the smart elevator system provides alerts to passengers waiting at the current floor to indicate that the system is operating in the drop-off only mode.

7. A method of controlling a smart elevator system with a dynamic occupancy limit stored in memory and a weight-based maximum occupancy, wherein the dynamic occupancy limit is substantially less than the weight-based maximum occupancy, the method comprising the steps of:

retrieving the dynamic occupancy limit from memory;

detecting a number of occupants in the elevator;

determining an available occupancy based on the number of occupants in the elevator and the dynamic occupancy limit;

detecting the number of passengers waiting for the elevator at the current floor; and initiating a queueing process when the number of passengers at the current floor is greater than the available occupancy;

wherein initiating the queueing process includes sending messages to passengers waiting at the current floor;

wherein sending messages to passengers waiting at the current floor includes sending a first message to a mobile device of a first passenger waiting at the current floor and sending a second message to a mobile device of a second passenger waiting at the current floor, wherein the first message is substantially different from the second message.

8. The method of controlling a smart elevator system according to claim 7, wherein the method further includes receiving image information from an imaging sensor, and wherein detecting the number of occupants in the elevator includes analyzing the images from the imaging sensor.

9. The method of controlling a smart elevator system according to claim 7, wherein detecting the number of passengers waiting for the elevator at the current floor includes receiving information from one or more mobile devices of passengers waiting for the elevator at the current floor.

10. The method of controlling a smart elevator system according to claim 7, wherein determining the available occupancy includes considering the dynamic occupancy limit, the current number of occupants, and the number of occupants exiting at next floor.

11. The method of controlling a smart elevator system according to claim 10, wherein the method further includes determining an optimized schedule that minimizes average wait time for users while preventing the elevator occupancy from exceeding the dynamic occupancy limit.

* * * * *